(12) United States Patent
Liu et al.

(10) Patent No.: US 10,061,023 B2
(45) Date of Patent: Aug. 28, 2018

(54) OBJECT DETECTION APPARATUS AND METHOD

(71) Applicant: Panasonic Intellectual Property Management Co., Ltd., Osaka (JP)

(72) Inventors: Weijie Liu, Kanagawa (JP); Yoichi Nakagawa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 451 days.

(21) Appl. No.: 15/006,239

(22) Filed: Jan. 26, 2016

(65) Prior Publication Data

US 2016/0238703 A1    Aug. 18, 2016

(30) Foreign Application Priority Data

Feb. 16, 2015 (JP) .................................. 2015-027514
Sep. 30, 2015 (JP) .................................. 2015-193173

(51) Int. Cl.
*G01S 13/86*    (2006.01)
*G01S 13/88*    (2006.01)
(Continued)

(52) U.S. Cl.
CPC ............ *G01S 13/867* (2013.01); *G01S 7/415* (2013.01); *G01S 13/52* (2013.01); *G01S 13/723* (2013.01);
(Continued)

(58) Field of Classification Search
CPC ...... G01S 13/867; G01S 13/886; G01S 13/04; G01S 13/56; G01S 13/52; G01S 13/723;
(Continued)

(56) References Cited

U.S. PATENT DOCUMENTS

2007/0225933 A1* 9/2007 Shimomura ....... G06K 9/00791
                                                  702/127
2009/0228204 A1* 9/2009 Zavoli .................... G01C 21/30
                                                  701/532

(Continued)

FOREIGN PATENT DOCUMENTS

JP    2010-151621    7/2010

OTHER PUBLICATIONS

R. C. Gonzalez et al., "Digital Image Processing" Prentice Hall, 2002. pp. 613-626.

*Primary Examiner* — Olumide Ajibade Akonai
(74) *Attorney, Agent, or Firm* — Seed IP Law Group LLP

(57) ABSTRACT

A capture region calculation unit calculates a capture point having the local highest reflection intensity in power profile information and calculates a capture region surrounding the capture point. An edge calculation unit calculates the edges of one or more objects from image data. A marker calculation unit calculates a marker from the capture region. A component region calculation unit calculates component regions by extending the marker using the edges. A grouping unit groups component regions belonging to the same object, of the component regions. The object identification unit identifies the types of one or more objects (e.g., large vehicle, small vehicle, bicycle, pedestrian, flight object, bird) on the basis of a target object region resulting from the grouping.

10 Claims, 11 Drawing Sheets

(51) Int. Cl.
  *G01S 13/72*  (2006.01)
  *G01S 13/91*  (2006.01)
  *G01S 7/41*  (2006.01)
  *G01S 13/52*  (2006.01)
  G01S 13/538  (2006.01)
  G01S 13/93  (2006.01)
(52) U.S. Cl.
  CPC .............. *G01S 13/88* (2013.01); *G01S 13/91* (2013.01); *G01S 13/538* (2013.01); *G01S 13/886* (2013.01); *G01S 13/931* (2013.01)
(58) Field of Classification Search
  CPC .......... G01S 13/86; G01S 13/88; G01S 13/91; G01S 13/931; G01S 17/89; G01S 7/04; G01S 7/415; G01C 21/26
  See application file for complete search history.

(56) References Cited

U.S. PATENT DOCUMENTS

| | | | |
|---|---|---|---|
| 2010/0134345 A1* | 6/2010 | Ruggiano | G01S 7/285 342/159 |
| 2010/0169015 A1* | 7/2010 | Tsunekawa | G08G 1/165 701/300 |
| 2012/0019655 A1* | 1/2012 | Fukamachi | G06T 7/2006 348/142 |
| 2013/0300870 A1 | 11/2013 | Messely et al. | |
| 2016/0202355 A1* | 7/2016 | Liu | G01S 7/41 342/70 |

* cited by examiner

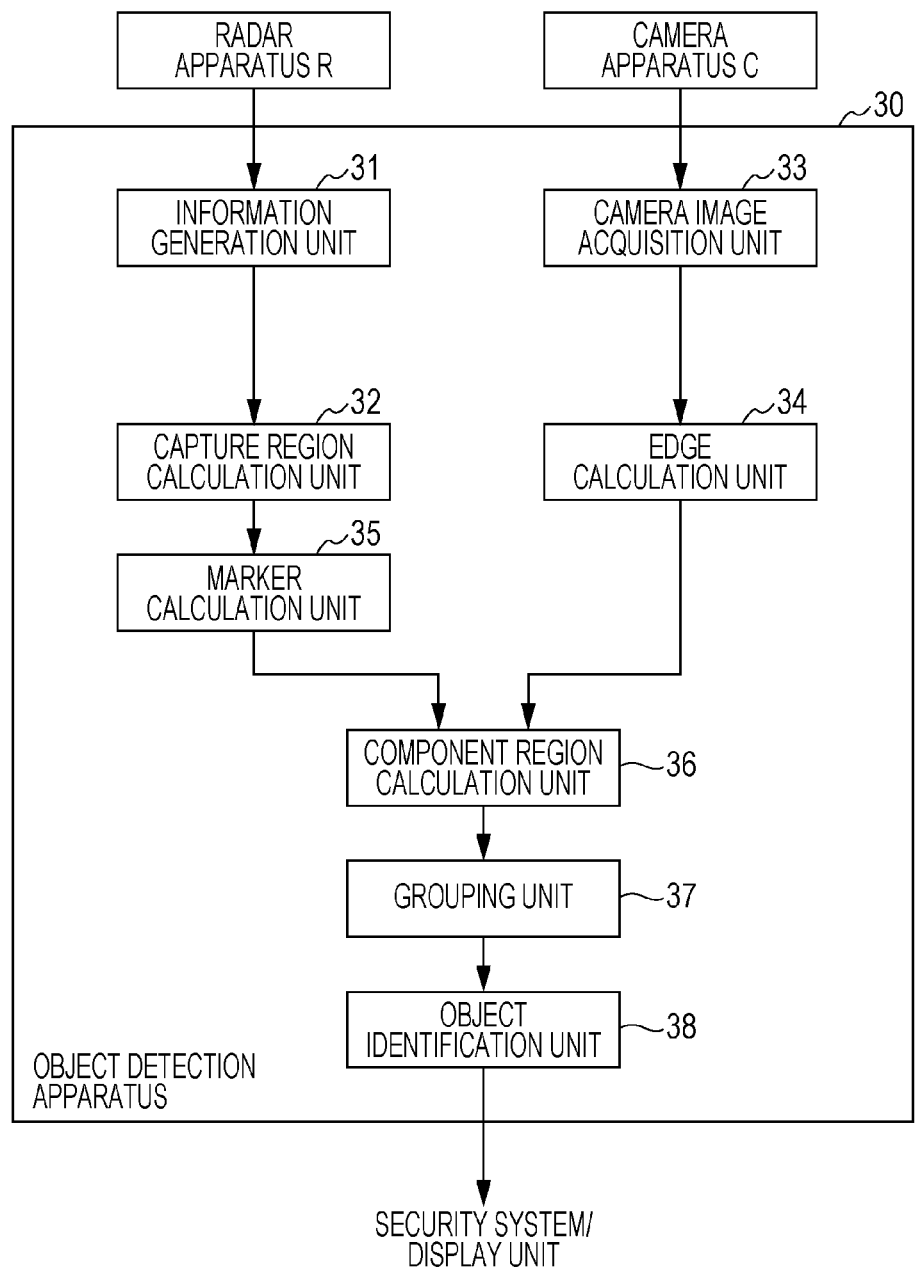

OBJECT DETECTION APPARATUS AND METHOD

BACKGROUND OF THE INVENTION

1. Field of the Invention

The present disclosure relates to an object detection apparatus and method. More specifically, the present disclosure relates to an object detection apparatus and method that are used with a vehicle, a road infrastructure system, or a system for monitoring a particular facility and that can individually and accurately detect objects around the vehicle or the like.

2. Description of the Related Art

In recent years, radar apparatuses or camera apparatuses for vehicles have been mounted on vehicles such as passenger cars and have detected other vehicles, pedestrians, and bicycles around the vehicles, objects installed on roads, or the like. A radar apparatus or camera apparatus for vehicles detects a target object approaching the vehicle from the front or side of the vehicle and measures the position, speed, or the like of the target object relative to the vehicle. The radar apparatus then determines whether or not the target object may collide with the vehicle, on the basis of the measurement result. If it determines that there is such a risk, the radar apparatus gives an alarm to the driver or automatically controls the vehicle so that the collision is avoided.

For example, Japanese Unexamined Patent Application Publication No. 2010-151621 discloses a technology that detects objects using both radar and camera apparatuses for vehicles. Specifically, Japanese Unexamined Patent Application Publication No. 2010-151621 identifies the number of target objects and the azimuth range thereof using measurement information acquired by the camera apparatus and corrects measurement information acquired by the radar apparatus on the basis of the target object number and azimuth range.

U.S. Patent Application Publication No. 2013/0300870 discloses a technology that monitors traffic volume using both camera and radar apparatuses installed around a road. Specifically, U.S. Patent Application Publication No. 2013/0300870 monitors and manages traffic by detecting position and speed information of a remote vehicle using the radar apparatus, identifying the position of the vehicle in a camera image, and then presenting the situations of remoter and closer vehicles than the vehicle in the camera image.

Conventionally, a radar apparatus or camera apparatus is installed to monitor a particular facility such as an airport, harbor, railroad station, or building and prevents intrusion of suspicious objects (including a suspicious person) by detecting an object intruding from above the ground or midair (space higher than above the ground) and presenting information to a related security system or display unit.

SUMMARY

However, the conventional technology of Japanese Unexamined Patent Application Publication No. 2010-151621 has to identify the number of target objects and the azimuth range thereof using measurement information acquired by the camera apparatus mounted on a vehicle. That is, the vehicle-mounted camera apparatus is required to deliver high object detection performance.

As for the conventional technology of U.S. Patent Application Publication No. 2013/0300870, when the radar apparatus acquires multiple detection results from one vehicle, it would have difficulty in identifying the position of the vehicle.

That is, with respect to the above conventional technologies, the object detection accuracy depends on the performance of the camera apparatus or radar apparatus, whether the camera apparatus or radar apparatus is mounted on a vehicle or used with a road infrastructure system or a system for monitoring a particular facility. Accordingly, these conventional technologies have difficulty in effectively combining the sensing function of a radar apparatus and the sensing function of a camera apparatus to improve object detection accuracy.

Thus, a non-limiting exemplary embodiment of the present disclosure provides an object detection apparatus and method that can effectively combine the sensing function of a radar apparatus and the sensing function of a camera apparatus to improve object detection accuracy.

In one general aspect, the techniques disclosed here feature: an object detection apparatus including an information generation circuitry which, in operation, calculates a reflection intensity with respect to each cell of cells, the cells being obtained by dividing a distance from a radar apparatus into predetermined intervals with respect to each transmission direction of a radar signal transmitted by the radar apparatus, the reflection intensity being a representative value of power of one or more received signals, the one or more received signals being the radar signal reflected by an object and being received by the radar apparatus, and generates power profile information for each cell of the cells by using the reflection intensities, a capture region calculation circuitry which, in operation, identifies a cell having a local highest reflection intensity in the power profile information, from among the cells as a capture point for capturing the object and identifies one or more cells surrounding the capture point as a capture region, an edge extraction circuitry which, in operation, extracts edges of the object included in an image captured by a camera apparatus, a marker calculation circuitry which, in operation, converts the capture region into a partial region of the image based on a coverage of the radar apparatus and a coverage of the camera apparatus and determines the partial region which is a region of the image corresponding to the capture region, as a marker, a component region calculation circuitry which, in operation, determines component regions corresponding to components of the object by extending the marker by using the edges as boundaries, a grouping circuitry which, in operation, groups the component regions into a target object region, and an object identification circuitry which, in operation, identifies the object from the target object region and outputs the identification result.

These general and specific aspects may be implemented using a device, a system, a method, and a computer program, and any combination of devices, systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to the present disclosure, it is possible to effectively combine the sensing function of a radar apparatus and the sensing function of a camera apparatus to improve object detection accuracy.

BRIEF DESCRIPTION OF DRAWINGS

FIG. 3 shows main elements of an object detection apparatus according to a first embodiment of the present disclosure;

DETAILED DESCRIPTION

Figure 1A:
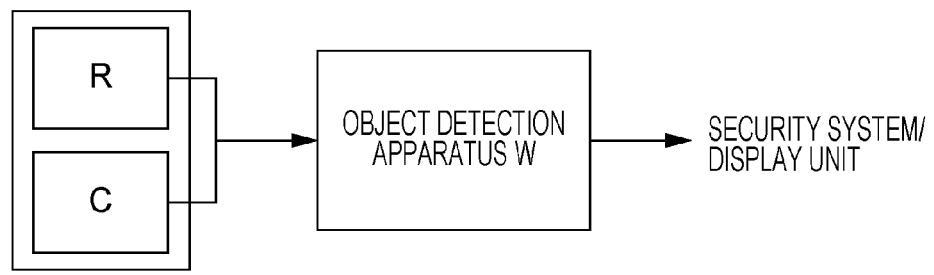
FIG. 1A shows the configuration of a sensing unit using an object detection apparatus according to the present disclosure.

Underlying Knowledge Forming Basis of the Present Disclosure

First, underlying knowledge forming the basis of the present disclosure will be described. The present disclosure relates to radar and camera apparatuses for vehicles, radar and camera apparatuses for road infrastructure systems, and an object detection apparatus for systems for monitoring a particular facility.

Currently, radar and camera apparatuses for vehicles are being mounted on many vehicles, and radar and camera apparatuses for road infrastructure systems are being introduced to road infrastructure systems. While a radar apparatus or camera apparatus has been singly used in systems for monitoring a particular facility, many such monitoring systems are currently using both radar and camera apparatuses.

Radar and camera apparatuses for road infrastructure systems are installed in the vicinity of a road, such as an intersection, and monitor and manage the traffic by detecting vehicles, pedestrians, bicycles, and the like on the road and its vicinity.

Specifically, radar and camera apparatuses for road infrastructure systems monitor the traffic by detecting traffic volume, as well as speeding, red light running, and the like and manage the traffic by controlling traffic signals on the basis of the detected traffic volume. Further, radar and camera apparatuses for road infrastructure systems detect an object in the blind spot of a vehicle and notify the driver of the vehicle of information about the detected object. Accordingly, radar and camera apparatuses for road infrastructure systems help make the traffic efficient and prevent traffic accidents.

Radar and camera apparatuses for vehicles, as well as radar and camera apparatuses for road infrastructure systems have to accurately detect target objects having different features, including vehicles, pedestrians, bicycles, and motorcycles. Radar and camera apparatuses for monitoring systems have to accurately detect various types of vehicles and pedestrians when monitoring an aboveground area and various types of flight vehicles and birds when monitoring a midair space.

If the above-mentioned radar and camera apparatuses accurately detect target objects in midair or above the ground, they can accurately grasp the states of such objects or traffic volume and thus accurately predict the possibility of intrusion or collision. In contrast, if the radar and camera apparatuses do not accurately detect target objects in midair or above the ground, that is, if the radar and camera apparatuses omit or erroneously detect some target objects, they would have difficulty in accurately grasping the states of such objects or traffic volume and thus predicting the possibility of intrusion or collision.

In a typical measurement, a radar apparatus acquires multiple strong reflection points (hereafter referred to as capture points) from a single target object. Accordingly, detecting the target object from the measurement result requires grouping the capture points of the same target object.

Japanese Unexamined Patent Application Publication No. 2010-151621 identifies the number of target objects and the azimuth range thereof on the basis of measurement information acquired by the camera apparatus mounted on a vehicle and re-groups or ungroups grouped capture points on the basis of the number and azimuth range of the target objects. Thus, Japanese Unexamined Patent Application Publication No. 2010-151621 avoids erroneous detection or omission of some target objects.

However, with respect to Japanese Unexamined Patent Application Publication No. 2010-151621, the object detection accuracy varies with the accuracy of the number and azimuth range of target objects, that is, the accuracy of the sensing function of the camera apparatus.

As for U.S. Patent Application Publication No. 2013/0300870, when it acquires multiple capture points from a vehicle serving as a target object, it has difficulty in detecting the vehicle, thereby making this technology difficult to use.

In view of the foregoing, the present inventors noted that it was possible to effectively combine measurement information acquired by a camera apparatus and measurement information acquired by a radar apparatus by considering the difference between these types of information, and then accomplished the present disclosure.

Radar and camera apparatuses for vehicles according to the present disclosure accurately detect vehicles, bicycles, and pedestrians around a vehicle having the apparatuses mounted thereon, predict a risk that another vehicle or the like may collide with the vehicle, and give an alarm or control the vehicle to avoid the risk. Accordingly, the radar and camera apparatuses help prevent traffic accidents.

Radar and camera apparatuses for systems for monitoring a particular facility, such as an airport, harbor, railroad station, or building, according to the present disclosure accurately detect flight objects and birds in midair or various types of vehicles and intruders above the ground and present information to an external security system. Accordingly, the radar and camera apparatuses help prevent intrusion of a suspicious person and ensure the safety of the facility.

Radar and camera apparatuses for road infrastructure systems according to the present disclosure accurately detect vehicles, bicycles, and pedestrians on a road and its vicinity, including an intersection, predict the possibility of collision, avoid collision, and grasp and manage traffic volume. Accordingly, the radar and camera apparatuses help prevent traffic accidents and make traffic management efficient.

Use Image of Present Disclosure

Hereafter, the connecting method and mounting position of an object detection apparatus according to the present disclosure will be described with reference to the drawings.

Figure 1B:
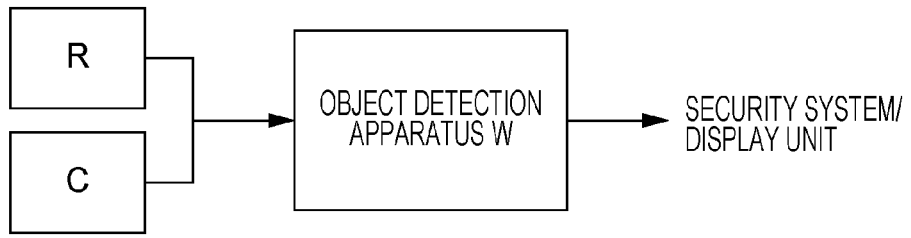
FIG. 1B shows the configuration of a sensing unit using an object detection apparatus according to the present disclosure.

FIGS. 1A and 1B are conceptual diagrams showing the configuration of a sensing unit using an object detection apparatus according to the present disclosure. In FIGS. 1A and 1B, R and C represent a radar apparatus and a camera apparatus, respectively, and W represents an object detection apparatus according to the present disclosure. FIG. 1A shows a case in which the radar apparatus R and camera apparatus C are mounted in the same casing and connected to the object detection apparatus W; FIG. 1B shows a case in which the radar apparatus R and camera apparatus C are mounted in different casings and connected to the object detection apparatus W. Note that the object detection apparatus W in FIGS. 1A and 1B is further connected to an external security system or display unit.

The present disclosure does not impose any restriction on the mounting method and locations of the radar apparatus R and camera apparatus C or the relative positions thereof. Nor does it impose any restriction on the positional relationship between the detection regions of the radar apparatus R and camera apparatus C. However, the present disclosure is applied to the overlapping region between the detection regions of the radar apparatus R and camera apparatus C and therefore it is preferred to mount the radar apparatus R and camera apparatus C in such a manner that the overlapping region is increased.

The present disclosure provides an object detection apparatus that processes measurement information acquired by the radar apparatus R and measurement information acquired by the camera apparatus C while combining these types of information. The object detection apparatus W according to the present disclosure does not impose any restriction on the configuration of the radar apparatus R nor the configuration of the camera apparatus C. Both the radar apparatus R and camera apparatus C may be existing commercially available products or products manufactured using a known technology.

While the object detection apparatus W is mounted independently of the radar apparatus R and camera apparatus C in the conceptual diagrams shown in FIGS. 1A and 1B, the object detection apparatus W may be mounted in the radar apparatus R or camera apparatus C.

In the present disclosure, the radar apparatus R and camera apparatus C, which are connected to the object detection apparatus W, may transmit measurement information to the object detection apparatus W using any transmission method. The transmission method may be a wired communication method or wireless communication method.

Figure 2A:
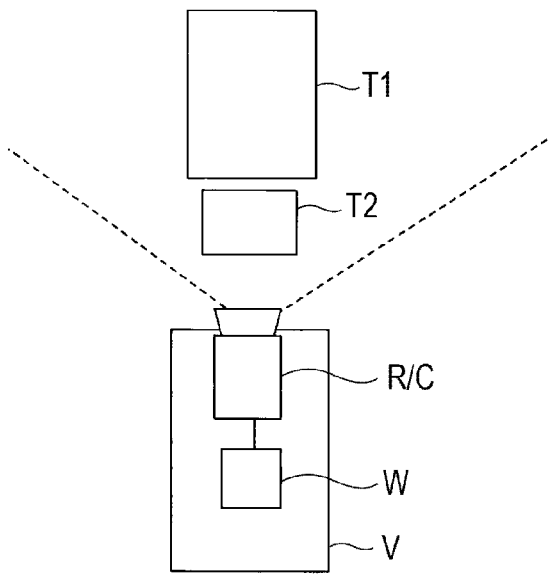
FIG. 2A shows the mounting position of an object detection apparatus according to the present disclosure.
Figure 2B:
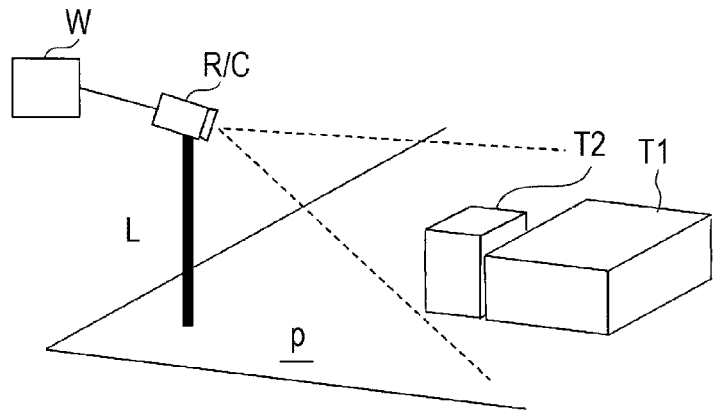
FIG. 2B shows the mounting position of an object detection apparatus according to the present disclosure.

Now, the mounting position of the object detection apparatus W according to the present disclosure will be described with reference to FIGS. 2A and 2B. FIGS. 2A and 2B are conceptual diagrams showing the mounting position of the object detection apparatus W according to the present disclosure. FIG. 2A is a conceptual diagram showing that the object detection apparatus W is mounted on a vehicle along with the radar apparatus R and camera apparatus C. FIG. 2B is a conceptual diagram showing that the object detection apparatus W is being used in a road infrastructure system along with the radar apparatus R and camera apparatus C.

In FIG. 2A, V represents the vehicle; R/C represents a measurement apparatus mounted on the vehicle and including the radar apparatus R and camera apparatus C; and T1 and T2 represent two different target objects. The object detection apparatus W may be integral with the measurement apparatus R/C or may be mounted in a different position from the measurement apparatus R/C, as long as the object detection apparatus W can detect objects in front of and on the sides of the vehicle.

In FIG. 2B, R/C represents a measurement apparatus mounted in a road infrastructure and including the radar apparatus R and camera apparatus C; p represents the road surface; L represents a support apparatus having the measurement apparatus R/C mounted thereon, such as a pole; and T1 and T2 represent two different target objects. FIG. 2B is a conceptual perspective view showing the vicinity of the mounting position of the measurement apparatus R/C.

The road surface p may be a straight road or may be part of an intersection. The mounting position of the measurement apparatus R/C may be above or on the side of the road or above or at any corner of an intersection. The present disclosure does not impose any restriction on the mounting position or method of the measurement apparatus R/C, as long as the measurement apparatus R/C can detect vehicles, pedestrians, bicycles, and the like around a crosswalk at an intersection.

In FIGS. 2A and 2B, the target object T1 is a larger object than the target object T2 and is, for example, an object such as a vehicle. The target object T2 is, for example, a motorcycle, bicycle, pedestrian, or the like. In the conceptual views shown in FIGS. 2A and 2B, the target object T2 is located closer to the radar apparatus than the target object T1. The object detection apparatus W according to the present disclosure detects the target objects T1 and T2 individually.

Although not shown, the object detection apparatus W according to the present disclosure may be mounted in a location in which it can monitor a particular facility such as an airport, harbor, railroad station, or building. The coverage of the object detection apparatus W according to the present disclosure is not limited to aboveground regions, and the object detection apparatus W may be used to monitor or measure midair.

Now, embodiments of the present disclosure will be described in detail with reference to the drawings. However, the embodiments described below are illustrative only, and the present disclosure is not limited thereto.

First Embodiment

First, an object detection apparatus according to a first embodiment of the present disclosure will be described with reference to the drawings. FIG. 3 is a block diagram showing main elements of an object detection apparatus 30 according to the first embodiment of the present disclosure.

The object detection apparatus 30 according to the first embodiment of the present disclosure is connected to a radar apparatus R and a camera apparatus C. The radar apparatus R includes a transmission unit that transmits a radar signal while changing the direction at intervals of a predetermined angle sequentially, a receiving unit that receives the radar signal reflected from a target object as a reflected signal, and a signal processing unit that converts the reflected signal into a baseband signal to acquire a delay profile (propagation delay characteristics) for each of the transmission directions of the radar signal. The camera apparatus C captures an image of the subject (target object) to acquire image data.

The object detection apparatus 30 includes an information generation unit 31, a capture region calculation unit 32, a camera image acquisition unit 33, an edge calculation unit 34, a marker calculation unit 35, a component region calculation unit 36, a grouping unit 37, and an object identification unit 38. The elements of the object detection apparatus 30 can be implemented as hardware such as an LSI circuit. The elements of the object detection apparatus 30 can also be implemented as part of an electronic control unit (ECU) that controls the vehicle.

The information generation unit 31 measures the representative value of the received power of the reflected signal (hereafter referred to as "reflection intensity") for each of cells using the delay profile outputted from the signal processing unit of the radar apparatus. The cells are obtained by dividing the distance from the radar apparatus into predetermined intervals for each of the transmission directions of the radar signal. The information generation unit 31 then generates power profile information indicating the reflection intensity of each cell and outputs it to the capture region calculation unit 32. While the reflection intensities typically take continuous values, the information generation unit 31 may perform a quantization process to simplify the process. Details of the power profile information generated by the information generation unit 31 will be described later.

The capture region calculation unit 32 first calculates a point having the local highest reflection intensity from the pieces of power profile information. The point having the local highest reflection intensity calculated by the capture region calculation unit 32 serves as a capture point for capturing a target object. Specifically, the capture region calculation unit 32 calculates the point having the local highest reflection intensity using a known method while handling the pieces of power profile information as an image. The capture region calculation unit 32 then calculates a capture region corresponding to the capture point using a known image processing method. The capture region is a local region surrounding the capture point and is composed of points having reflection intensities higher than or equal to a predetermined value, of the points around the capture point. A method by which the capture region calculation unit 32 calculates a capture region will be described later.

The camera image acquisition unit 33 receives the image data from the camera apparatus C, performs preprocessing such as image quality improvement on the image data, and outputs the resulting image data to the edge calculation unit 34.

The edge calculation unit 34 calculates the edge (outline) of the target object from the image data outputted by the camera image acquisition unit 33 using a known edge extraction method.

The marker calculation unit 35 calculates a marker from the capture region calculated by the capture region calculation unit 32. The marker is a partial region corresponding to the capture region, of the camera image. A method by which the marker calculation unit 35 calculates a marker will be described later.

The component region calculation unit 36 calculates component regions by extending the marker calculated by the marker calculation unit 35 using the edge of the camera image calculated by the edge calculation unit 34. A method by which the component region calculation unit 36 calculates component regions will be described later.

The grouping unit 37 acquires a target object region by grouping component regions belonging to the same object, of the component regions calculated by the component region calculation unit 36. A method by which the grouping unit 37 groups component regions will be described later.

The object identification unit 38 identifies the position, size, and shape of the target object, as well as the type thereof (e.g., large vehicle, small vehicle, bicycle, pedestrian) on the basis of the target object region resulting from the grouping performed by the grouping unit 37. A method by which the object identification unit 38 identifies the target objects will be described later. The object identification unit 38 then outputs the identification result to an external security system or display unit.

Figure 4:
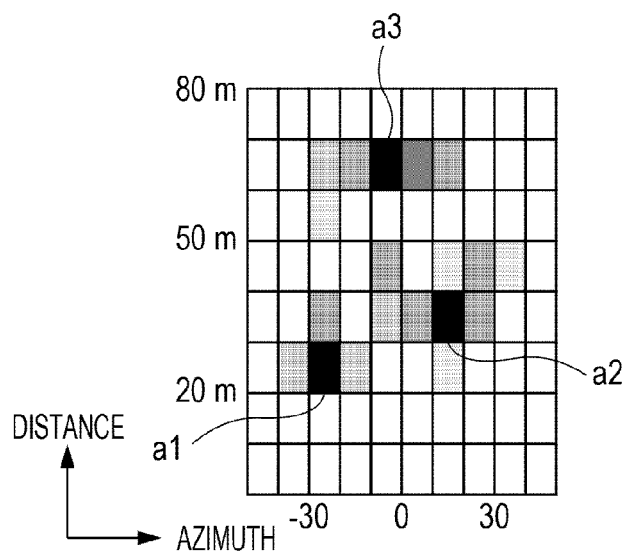
FIG. 4 shows an example of power profile information according to the first embodiment of the present disclosure.

Next, power profile information generated by the information generation unit 31 will be described. FIG. 4 is a diagram showing an example of power profile information according to the first embodiment of the present disclosure. The horizontal axis of FIG. 4 represents the azimuth of the radar apparatus R, and the vertical axis thereof represents the distance from the radar apparatus R. Hereafter, a plane defined by the azimuth range of the radar apparatus R and the region of the distance from the radar apparatus R will be referred to as the "radar measurement plane."

In the example in FIG. 4, cells are formed by dividing the range of the azimuth represented by the horizontal axis into intervals of 10° and dividing the range of the distance represented by the vertical axis into intervals of 10 m. Note that in the present embodiment, the azimuth interval and distance interval of each cell are not limited to those described above. Each interval is preferably smaller, since higher resolution is obtained.

In the power profile information in FIG. 4, the density of each cell represents the reflection intensity, and a darker cell indicates a higher reflection intensity. For simplicity, cells other than particular cells are colored in white.

In the present embodiment, it is assumed that the reflection intensity (representative value) of each cell is the highest value of power received in the region of the cell. However, in the present disclosure, the reflection intensity (representative value) of each cell may be other values, for example, the average value of power received in the range of each cell.

In the following description, each cell of power profile information as shown in FIG. 4 is handled as a single point as necessary.

Next, a method by which the capture region calculation unit 32 calculates a capture region will be described with reference to FIGS. 4 and 5.

The capture region calculation unit 32 first calculates a capture point from the power profile information shown in FIG. 4. The capture point is a point having the local highest reflection intensity in the power profile information. The point having the local highest reflection intensity may be calculated using a known method. For example, the point having the local highest reflection intensity may be calculated as follows: a comparison is made among the reflection intensity of a particular point and those of adjacent points; and if the reflection intensity of the particular point is higher than those of the adjacent points by a predetermined value or more, the particular point is regarded as a point having the local highest reflection intensity.

In the case of the power profile information shown in FIG. 4, the capture region calculation unit 32 calculates points having the local highest reflection intensity as capture points a1, a2, and a3.

The capture region calculation unit 32 then calculates a capture region surrounding the capture points a1, a2, and a3 using a known image processing technique, such as the region growing image processing technique, while handling the power profile information as an image. For details of the region growing image processing technique, see R. C. Gonzalez and R. E. Woods, *Digital Image Processing*, Prentice Hall, 2001.

Figure 5:
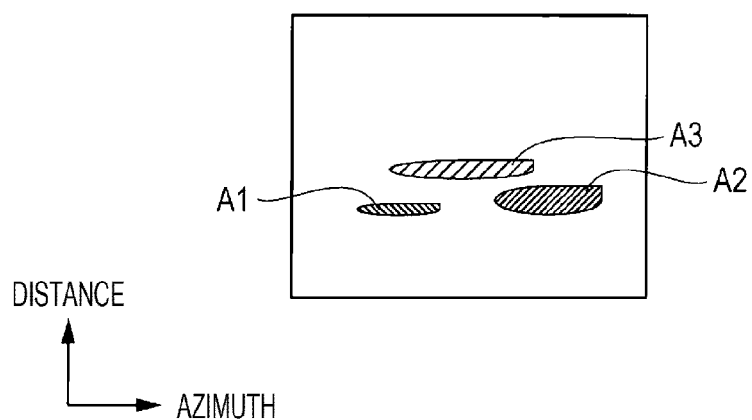
FIG. 5 shows an example of calculated capture regions according to the first embodiment of the present disclosure.

FIG. 5 is a diagram showing an example of the calculated capture region according to the first embodiment of the present disclosure. The horizontal direction of FIG. 5 corresponds to the azimuth of the radar apparatus R, and the vertical direction thereof corresponds to the distance from the radar apparatus R. Capture regions A1, A2, and A3 shown in FIG. 5 are local regions surrounding the capture points a1, a2, and a3, respectively. The capture regions A1, A2, and A3 are also local regions on the radar measurement plane. Typically, a capture region is more insusceptible to noise than a capture point.

Next, a method by which the marker calculation unit 35 calculates a marker will be described. The marker calculation unit 35 calculates a marker, which is a partial region on a plane of a camera image, from a capture region, which is a local region on the radar measurement plane. Hereafter, a plane defined by the horizontal direction and vertical direction of a camera image will be referred to as the "camera image plane." Since the coordinates on the camera image plane do not match the coordinates on the radar measurement plane, the marker calculation unit 35 calculates a marker from a capture region by performing coordinate transformation. Hereafter, a case will be described in which the marker calculation unit 35 calculates a marker from the capture region A corresponding to the target object T1.

Specifically, the marker calculation unit 35 sequentially performs three types of coordinate transformation: the transformation of coordinates on the radar measurement plane into coordinates in a three-dimensional radar measurement space; the transformation of the coordinates in the three-dimensional radar measurement space into coordinates in a three-dimensional camera space; and the transformation of the coordinates in the three-dimensional camera space into coordinates on the camera image plane.

The three-dimensional radar measurement space is a space scanned by the radar apparatus R, and the three-dimensional camera space is a space in which the camera apparatus C captures images. If the radar apparatus R and camera apparatus C are mounted in different positions, the three-dimensional radar measurement space and three-dimensional camera space may not match each other.

Here it is assumed that the azimuth range of the capture region A on the radar measurement plane is from $\theta 1$ to $\theta 2$, and the distance range thereon is from d1 to d2. The azimuth range is determined from the minimum azimuth $\theta 1$ and maximum azimuth $\theta 2$ of the capture region A, and the distance range is determined from the minimum distance d1 and maximum distance d2 of the capture region A.

Transformation of Coordinates on Radar Measurement Plane into Coordinates in Three-Dimensional Radar Measurement Space First, there will be described the transformation of coordinates on the radar measurement plane into coordinates in the three-dimensional radar measurement space. In this transformation, the position and size in the three-dimensional radar measurement space corresponding to the capture region A is calculated from the azimuth range $\theta 1$ to $\theta 2$ and distance range d1 to d2 of the capture region A.

Figure 6:
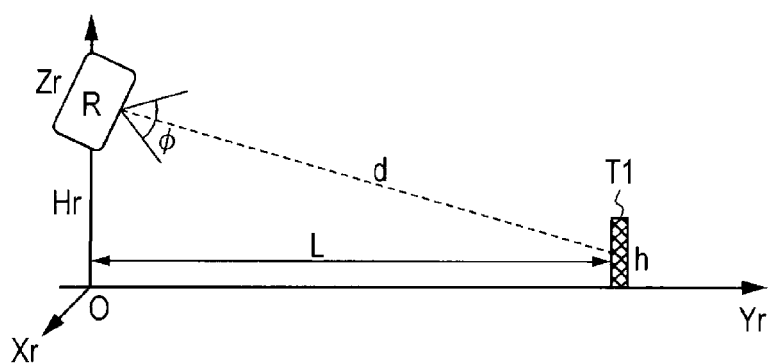
FIG. 6 shows an example of the coordinate system of a three-dimensional radar measurement space.

FIG. 6 is a diagram showing an example of the coordinate system of the three-dimensional radar measurement space. An origin O and Xr, Yr, and Zr axes shown in FIG. 6 represent the coordinate system of the three-dimensional radar measurement space. The radar apparatus R is mounted on the Zr axis. A height Hr represents the mounting height of the radar apparatus R. A distance d from the radar apparatus R shown in FIG. 6 corresponds to a distance d represented by the vertical axis on the radar measurement plane. A ground distance L is a distance to the target object T1 on an Xr-Yr plane (ground or road surface). A height h represents the height of the target object T1. The position and shape of the target object T1 are schematically shown.

Assuming that a Yr-Zr plane when Xr=0 is a direction of an azimuth $\theta$ of 0°, the radar apparatus R scans the three-dimensional radar measurement space shown in FIG. 6 using the Zr axis as a rotation axis. The azimuth $\theta$ represented by the horizontal axis of the radar measurement plane corresponds to the projection position of the scan surface of the radar apparatus R on the Xr-Yr plane of the three-dimensional radar measurement space. For example, the angle formed by the projection position of the scan surface and the Yr axis corresponds to the azimuth $\theta$. FIG. 6 shows a case in which the target object T1 lies in a position corresponding to the azimuth $\theta$ of 0°.

While the radar apparatus R typically measures a reflection intensity corresponding to the azimuth $\theta$ and distance d, it does not accurately detect the direction of the Zr axis in FIG. 6 and, more specifically, an elevation angle $\varphi$ in FIG. 6. That is, the radar apparatus R cannot detect the height of the target object T1 from the reflection intensity and thus has difficulty in detecting the ground distance L to the target object T1.

For this reason, the marker calculation unit 35 of the present embodiment presets the highest possible height hp of the target object T1. The highest possible height hp is the highest value that can be taken as the height of the target object T1. For example, if the target object T1 is a pedestrian, the highest possible height hp is set to 2 m. Note that the target object T1 has yet to be identified at this point in time. The highest possible height hp is set on the basis of the size, reflection intensity, or the like of the capture region corresponding to the target object T1.

The marker calculation unit 35 calculates the range of the ground distance L to the target object T1 in the three-dimensional radar measurement space from the distance d on the radar measurement plane using the highest possible height hp.

Figure 7:
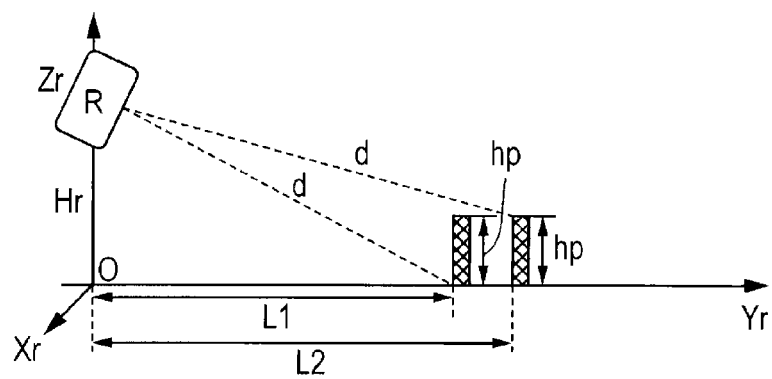
FIG. 7 shows the relationship among the distance, highest possible height, and ground distance.

FIG. 7 is a diagram showing the relationship among the distance d, highest possible height hp, and ground distance L. FIG. 7 shows a case in which a signal is reflected by a portion near the ground (Zr=0 in FIG. 7), of the target object T1 and a case in which a signal is reflected by a portion near the highest possible height hp, of the target object T1.

As shown in FIG. 7, the ground distance L corresponding to the distance d of a single reflection intensity falls within a range between a ground distance L1 when a signal is reflected near the ground and a ground distance L2 when a signal is reflected near the highest possible height hp.

With respect to the distance range d1 to d2 of the capture region A, the marker calculation unit 35 calculates the ground distance L1 (L11) corresponding to the distance d1 and the ground distance L2 (L12) corresponding to the distance d1, as well as calculates the ground distance L1 (L21) corresponding to the distance d2 and the ground distance L2 (L22) corresponding to the distance d2. The marker calculation unit 35 then determines the minimum value Lmin and maximum value Lmax of L11, L12, L21, and L22. The marker calculation unit 35 then calculates a ground distance range Lmin to Lmax in the Yr axis direction from the distance range d1 to d2 of the capture region A.

As described above, the azimuth θ represented by the horizontal axis of the radar measurement plane corresponds to the projection position of the scan surface of the radar apparatus R on the Xr-Yr plane. Accordingly, the marker calculation unit 35 calculates the azimuth range θ1 to θ2 of the target object T1 on the Xr-Yr plane from the azimuth range θ1 to θ2.

Transformation of Coordinates in Three-Dimensional Radar Measurement Space into Coordinates in Three-Dimensional Camera Space Next, there will be described the transformation of coordinates in the three-dimensional radar measurement space into coordinates in the three-dimensional camera space. Since the mounting positions of the radar apparatus R and camera apparatus C are known, coordinates in the three-dimensional radar measurement space are transformed into coordinates in the three-dimensional camera space using a typical coordinate transformation method.

By performing this transformation, a marker, which is a partial region on the camera image plane, can be calculated from a capture region, which is a local region on the radar measurement plane, even when the radar apparatus R and camera apparatus C are mounted in different positions.

For simplicity, it is assumed that the three-dimensional camera space is the same as the three-dimensional radar measurement space having the Xr-Yr-Zr coordinate system. That is, in the following description, the azimuth range θ1 to θ2 in the three-dimensional radar measurement space and the ground distance range Lmin to Lmax in the Yr axis direction are applied to the three-dimensional camera space as they are.

Transformation of Coordinates in Three-Dimensional Camera Space into Coordinates on Camera Image Plane Next, there will be described the transformation of coordinates in the three-dimensional camera space into coordinates on the camera image plane. In this transformation, the azimuth range θ1 to θ2 in the three-dimensional camera space (which is the same as the three-dimensional radar measurement space) and the ground distance range Lmin to Lmax in the Yr axis direction are converted into corresponding ranges on the camera image plane. The ranges on the camera image plane resulting from this transformation, that is, a partial region on the camera image plane are a marker corresponding to the capture region A.

First, there will be described a method for converting the ground distance range Lmin to Lmax in the Yr axis direction in the three-dimensional camera space into a corresponding range on the camera image plane.

Figure 8:
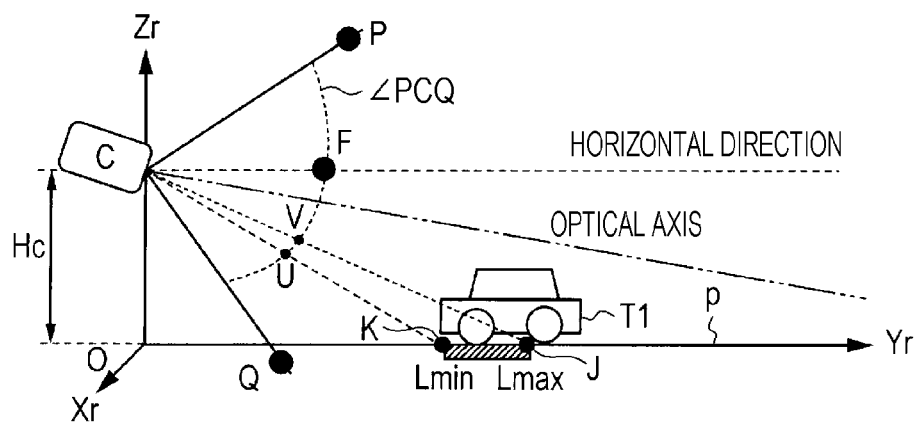
FIG. 8 shows the transformation of coordinates in a three-dimensional camera space into coordinates on a camera image plane.
Figure 9:
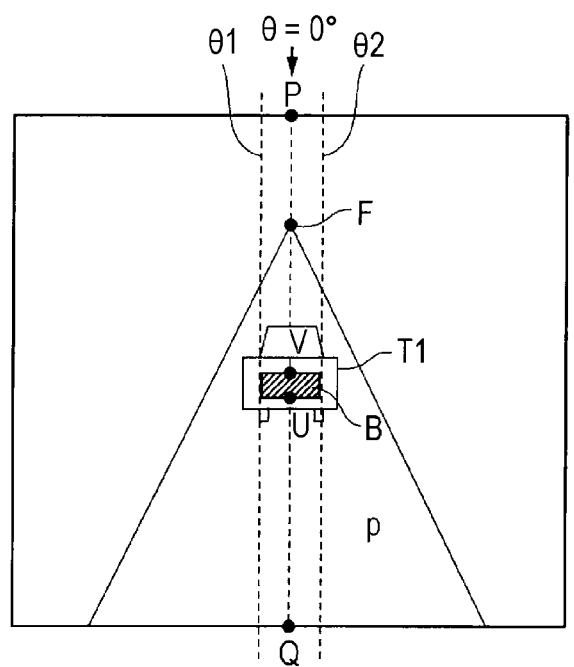
FIG. 9 shows an example of the camera image plane.

FIG. 8 is a diagram showing the transformation of coordinates in the three-dimensional camera space into coordinates on the camera image plane. FIG. 9 is a diagram showing an example of the camera image plane. FIG. 9 schematically shows an image captured by the camera apparatus C in the space shown in FIG. 8. While the camera image plane is shown in FIG. 9 for description purposes, the marker calculation unit 35 uses an actually captured image, that is, an image acquired by the camera image acquisition unit 33.

An origin O and Xr, Yr, and Zr axes shown in FIG. 8 represent the coordinate system of the three-dimensional camera space. The camera apparatus C is mounted on the Zr axis. A height Hc represents the mounting height of the camera apparatus C. In the following description, it is assumed that the position of the camera apparatus C and, more specifically, the center point when the camera apparatus C captures an image is a point C and that the point C is located at the height Hc on the Zr axis.

An angle ∠PCQ shown in FIG. 8 is the vertical view angle of the camera apparatus C. A point P and a point Q shown in FIGS. 8 and 9 correspond to the lower limit and upper limit, respectively, of the view angle range of the camera apparatus C. The point P and point Q are calculated from the view angle range of the camera apparatus C.

A Yr-Zr plane when Xr=0 in FIG. 8 corresponds to a PQ segment in FIG. 9. Xr=0 in FIG. 8 corresponds to the center of the horizontal view angle range of the camera apparatus C.

As shown in FIG. 9, a vanishing point F shown in FIG. 8 is an infinite point on a road surface p in the camera image plane. The vanishing point F is calculated using a known method.

The ground distance range Lmin to Lmax shown in FIG. 8 is a ground distance range obtained by converting the coordinates on the radar measurement plane into coordinates in the three-dimensional radar measurement space. In the following description, it is assumed that the ground distance range Lmin to Lmax is the range from a point K to a point J on the Yr axis.

As shown in FIGS. 8 and 9, a point V and a point U on the camera image plane correspond to the point J and point K, respectively. A range on the camera image plane corresponding to the ground distance range Lmin to Lmax in the Yr axis direction is calculated by calculating the positions of the point U and point V on the camera image plane.

First, a method for calculating the position of the point U on the camera image plane will be described.

A relational expression ∠PCF:∠PCQ=PF:PQ holds true for the vanishing point F, point P, and point Q. ∠PCF and ∠PCQ are angles in the three-dimensional camera space shown in FIG. 8, and PF and PQ are lengths on the camera image plane shown in FIG. 9. More specifically, ∠PCQ is the vertical view angle range of the camera apparatus C, and PQ is the vertical width of the camera image. Accordingly, both are known values determined by the specification of the camera apparatus C. The vanishing point F is calculated using a known method and therefore PF is also known. ∠PCF is calculated from the above relational expression.

Next, as shown in FIG. 8, ∠OKC is calculated from the height Hc, which is a length of OC, and the ground distance Lmin, which is a length OK, using a trigonometric function or the like. Since a straight line connecting the point C and point F is parallel with the Yr axis in FIG. 8, the calculated ∠OKC is the same as ∠UCF.

Next, a relational expression ∠UCF:∠PCF=UF:PF holds for the calculated ∠PCF and ∠UCF. PF and UF are lengths on the camera image plane shown in FIG. 9. The length UF is calculated from this relational expression.

The position of the point U on the camera image plane shown in FIG. 9 is calculated from the calculated UF. The point V on the camera image plane shown in FIG. 9 is calculated in a manner similar to that for the point U.

As described above, the marker calculation unit 35 calculates the positions of the point U and point V on the camera image plane from the ground distance range Lmin to Lmax in the Yr axis direction.

Next, there will be described a method for calculating a range on the camera image plane corresponding to the azimuth range θ1 to θ2 in the three-dimensional camera space.

The azimuth in the three-dimensional camera space corresponds to the horizontal distance from PQ on the camera image plane shown in FIG. 9. The horizontal view angle range of the camera apparatus C is a known range determined according to the specification and corresponds to the horizontal left and right edges of the camera image plane. The marker calculation unit 35 calculates ranges on the camera image plane corresponding to the azimuth range θ1 to θ2 and the horizontal view angle range of the camera apparatus C. That is, it calculates the horizontal distance from PQ.

Vertical lines θ1 and θ2 shown in FIG. 9 correspond to θ1 and θ2, respectively, of the azimuth range.

As described above, the marker calculation unit 35 calculates ranges on the camera image plane corresponding to the azimuth range θ1 to θ2 and ground distance range Lmin to Lmax in the Yr axis direction in the three-dimensional camera space. The marker calculation unit 35 then regards a rectangular frame surrounding the calculated ranges as a marker. A marker B in FIG. 9 is a marker corresponding to the capture region A. The marker B is a rectangle surrounded by horizontal straight lines passing through the calculated points U and V and the lines θ1 and θ2.

Figure 10:
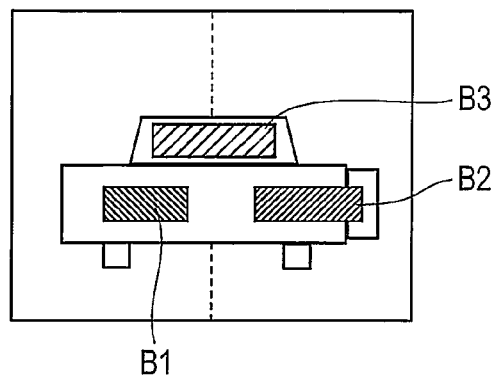
FIG. 10 is a diagram showing an example of calculated markers corresponding to the capture regions shown in FIG. 5.

FIG. 10 is a diagram showing an example of calculated markers corresponding to the capture regions shown in FIG. 5. Specifically, FIG. 10 shows markers B1, B2, and B3 on the camera image plane corresponding to the capture regions A1, A2, and A3 shown in FIG. 5. In FIG. 10, the markers B1, B2, and B3 are superimposed on the edge of the camera image calculated by the edge calculation unit 34. As shown in FIG. 10, the markers on the camera image plane are calculated from the capture regions on the radar measurement plane, as rectangles.

The method for calculating a marker using coordinate transformation described above is illustrative only, and the present disclosure is not limited thereto. The marker calculation unit 35 may convert capture regions and calculate markers on the basis of the azimuth and distance ranges in which the radar apparatus R can make measurements in real space and the range in which the camera apparatus C can capture images in real space. The azimuth and distance ranges in which the radar apparatus R can make measurements in real space are previously determined by the mounting position and specification of the radar apparatus R. The range in which the camera apparatus C can capture images in real space is previously determined by the mounting position and specification of the camera apparatus C.

While the markers described above are rectangles, the markers may be in shapes other than rectangles in the present disclosure.

Next, a method by which the component region calculation unit 36 calculates component regions will be described.

First, the component region calculation unit 36 divides a marker superimposed on an edge. In the case of FIG. 10, the marker B2 is superimposed on the edge and therefore the component region calculation unit 36 divides the marker B2.

Figure 11:
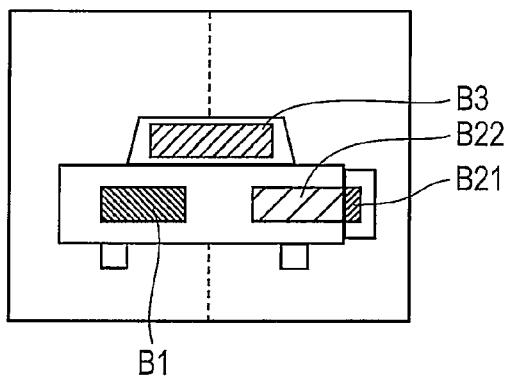
FIG. 11 is a diagram showing an example in which a component region calculation unit divides a marker.

FIG. 11 is a diagram showing an example in which the component region calculation unit 36 divides a marker. As shown in FIG. 11, the marker B2 superimposed on the edge in FIG. 10 is divided into markers B21 and B22.

The component region calculation unit 36 then calculates component regions by extending the regions using a known image processing technique, such as a watershed algorithm, while using the markers as seeds for range extension and using the edge as a boundary for range extension. As used herein, a component region refers to a partial region on the camera image plane corresponding to one of the components of an object.

Figure 12:
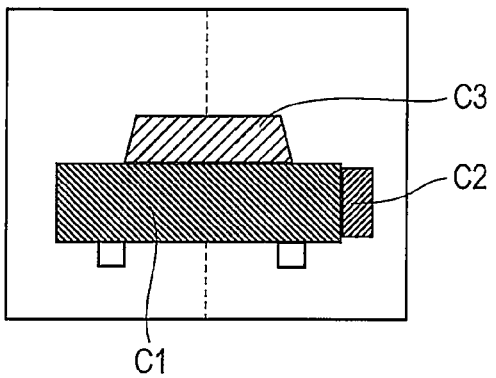
FIG. 12 is a diagram showing an example of the result of region extension performed by the component region calculation unit.

FIG. 12 is a diagram showing an example of the result of the region extension performed by the component region calculation unit 36. As the result of the region extension, a component region C1 is calculated from the markers B1 and B22; a component region C2 is calculated from the marker B21; and a component region C3 is calculated from the marker B3.

Next, a method by which the grouping unit 37 groups component regions will be described.

The grouping unit 37 groups component regions belonging to the same object, of the component regions calculated by the component region calculation unit 36. Whether a component region belongs to the same object is determined on the basis of one or both of information obtained from the camera image and information obtained by radar measurement.

The information obtained from the camera image is, for example, the textures of the component regions in the camera image. The grouping unit 37 makes a comparison among the textures of adjacent component regions and, if the textures are similar, groups the adjacent component regions. Whether the textures are similar may be determined on the basis of a predetermined threshold or the like.

The information obtained by radar measurement is, for example, Doppler information. As used herein, the "Doppler information" refers to speed information of points on the radar measurement plane. Accordingly, in order to determine whether a component region belongs to the same object using the Doppler information, it is necessary to coordinate-convert the component region, which a region on the camera image plane, into a region on the radar measurement plane.

The component region is coordinate-converted into a region on the radar measurement plane by only reversely performing the above-mentioned method for calculating a marker from a capture region.

Figure 13:
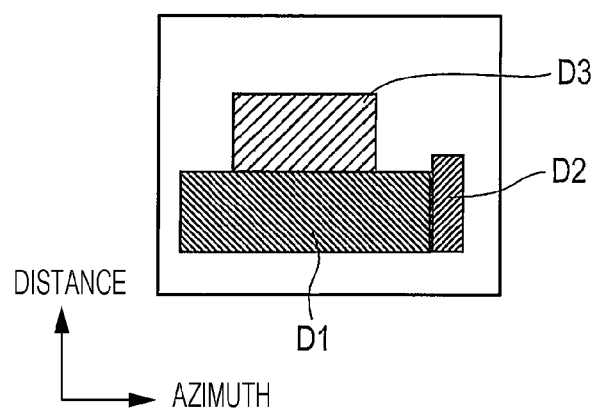
FIG. 13 shows an example of regions on the radar measurement plane obtained by coordinate-converting component regions.

FIG. 13 is a diagram showing an example of regions on the radar measurement plane obtained by coordinate-converting component regions. The horizontal direction of FIG. 13 corresponds to the azimuth of the radar apparatus R; the vertical direction thereof corresponds to the distance from the radar apparatus R; and each point (each cell) contains Doppler information. Regions D1, D2, and D3 in FIG. 13 correspond to the component regions C1, C2, and C3, respectively, shown in FIG. 12.

The grouping unit 37 makes a comparison among the pieces of Doppler information contained in the regions D1, D2, and D3 and, if the pieces of Doppler information are similar, groups the adjacent component regions on the camera image plane. Whether the pieces of Doppler information are similar may be determined on the basis of a predetermined threshold.

Figure 14:
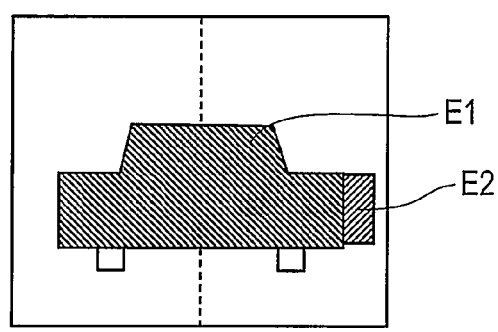
FIG. 14 is a diagram showing an example of the result of grouping performed by a grouping unit.

FIG. 14 is a diagram showing an example of the result of the grouping performed by the grouping unit 37. As shown in FIG. 14, the component regions C1 and C2 in FIG. 12 are grouped into a target object region E1; the component region C3 in FIG. 12 serves as a target object region E2 without being grouped.

In the example shown in FIG. 14, the grouping unit 37 acquires the two target object regions, E1 and E2, as the result of the grouping.

Next, a method by which the object identification unit 38 identifies target objects will be described.

The object identification unit 38 identifies the positions, sizes, and shapes of the target objects, as well as the types thereof on the basis of the target object regions resulting from the grouping performed by the grouping unit 37. In the first embodiment of the present disclosure, the identification method used by the object identification unit 38 is not limited to any specific one. For example, the object identification unit 38 may identify the target objects by previously holding template models indicating the sizes and shapes of target object regions corresponding to the types of objects and then comparing the target object regions resulting from the grouping performed by the grouping unit 37 with the template models. The object identification unit 38 may also identify the target objects by comparing the target object regions with a template model indicating the distribution of reflection intensities corresponding to the types of objects.

As an example, a case will be described in which the object identification unit 38 identifies the target objects by comparing the target object regions E1 and E2 shown in FIG. 14 with template models. The object identification unit 38 compares the target object region E1 with multiple template models held thereby and determines that the target object region E1 matches a vehicle template model. The object identification unit 38 also compares the target object region E2 with multiple template models held thereby and determines that the target object region E2 matches a pedestrian template model.

According to the present embodiment, the target object detection accuracy can be improved by converting capture regions on the radar measurement plane into markers on the camera image plane and superimposing the markers on the camera image. That is, the target object detection accuracy can be improved by effectively superimposing measurement information acquired by the radar on measurement information acquired by the camera.

Second Embodiment

Figure 15:
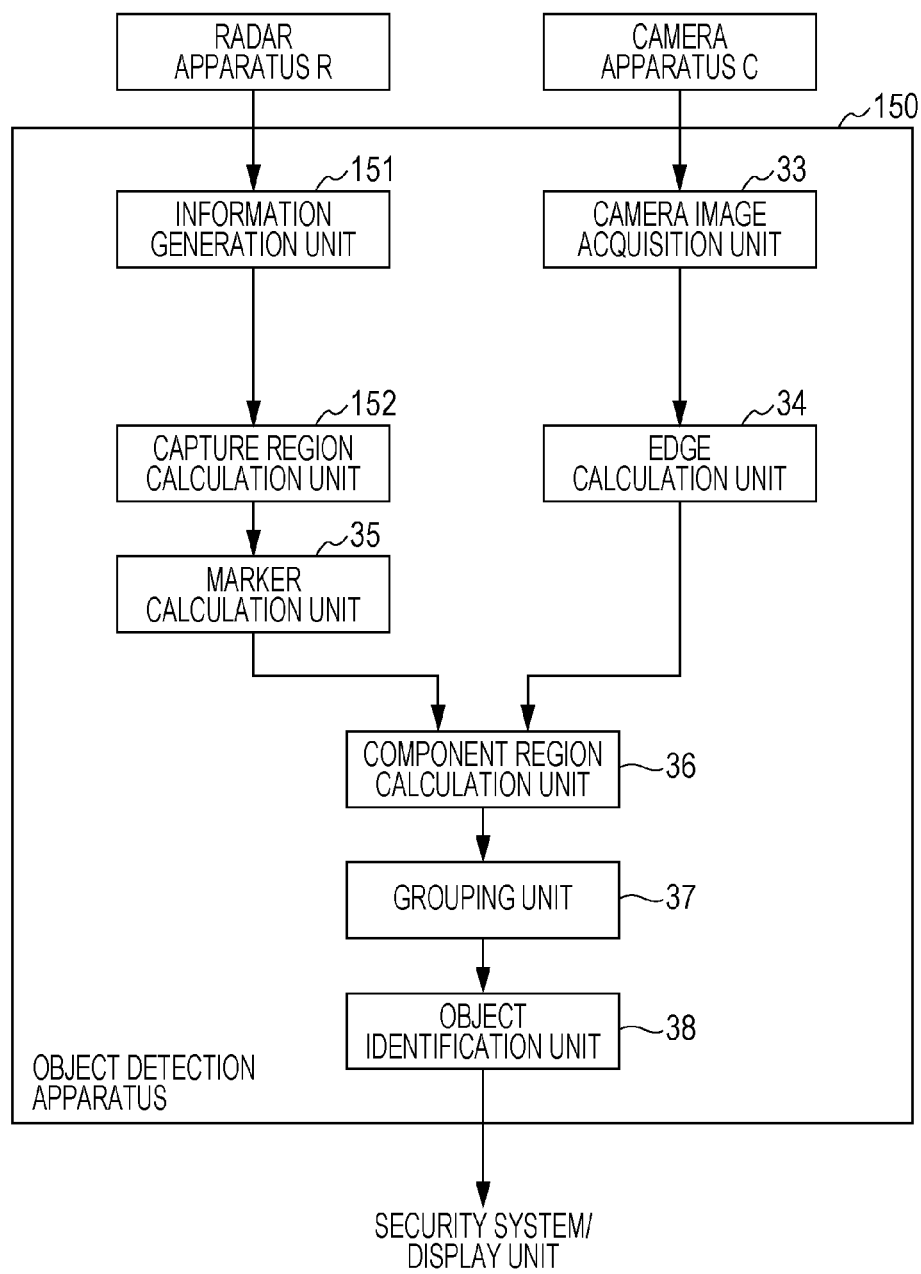
FIG. 15 shows main elements of an object detection apparatus according to a second embodiment of the present disclosure.

FIG. 15 is a block diagram showing main elements of an object detection apparatus 150 according to a second embodiment of the present disclosure. In FIG. 15, the same elements as those in FIG. 3 are given the same reference signs as those in FIG. 3 and therefore detailed description thereof will be omitted. An object detection apparatus 150 shown in FIG. 15 has a configuration in which the information generation unit 31 and capture region calculation unit 32 of the object detection apparatus 30 shown in FIG. 3 are replaced with an information generation unit 151 and a capture region calculation unit 152, respectively.

As with the information generation unit 31 of the first embodiment, the information generation unit 151 generates power profile information. The information generation unit 151 further generates Doppler profile information indicating the Doppler speeds of cells from a delay profile received from a radar apparatus R. In the Doppler profile information, the horizontal axis represents the azimuth, and the vertical axis represents the distance.

The capture region calculation unit 152 calculates a capture region on the basis of the power profile information and Doppler profile information.

Specifically, the capture region calculation unit 152 calculates a capture region from the power profile information using the method described in the first embodiment. The capture region calculation unit 152 then makes a comparison among the Doppler speeds of points (cells) included in the capture region and identifies whether the Doppler speeds match each other. The capture region calculation unit 152 then removes points (cells) having inconsistent Doppler profile values from the capture region.

The capture region calculation unit 152 outputs the resulting capture region to a marker calculation unit 35. The marker calculation unit 35 and subsequent elements perform processes similar to those described in the first embodiment.

According to the present embodiment, some points (cells) are removed from a capture region using the Doppler speed. Thus, it is possible to avoid the reflection intensities of signals reflected from different objects being included in the capture region.

While, in the present embodiment, the capture region calculation unit 152 calculates a capture region on the basis of power profile information and Doppler profile information, it may calculate a capture region on the basis of Doppler profile information.

Third Embodiment

Figure 16:
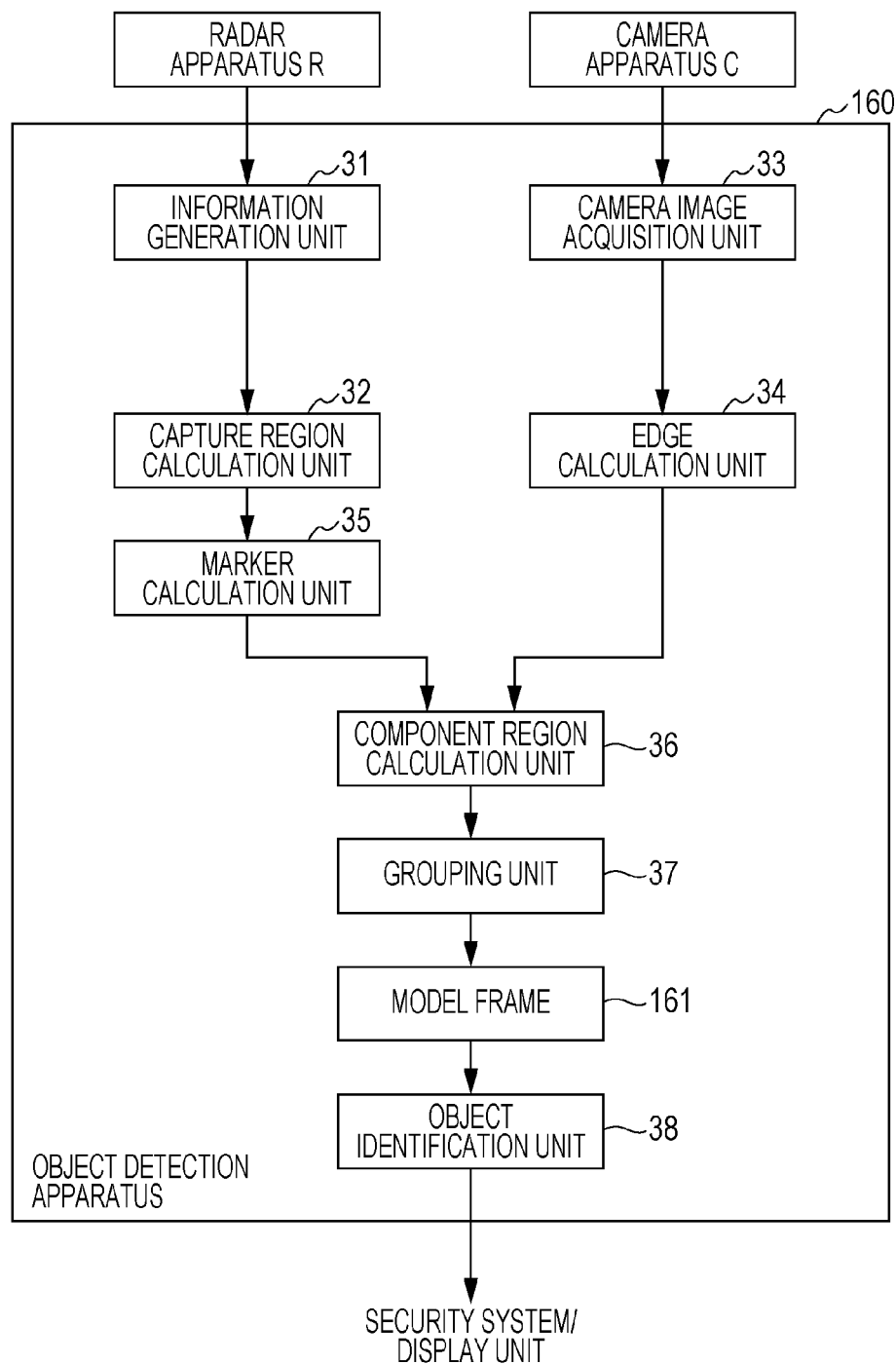
FIG. 16 shows main elements of an object detection apparatus according to a third embodiment of the present disclosure.

FIG. 16 is a block diagram showing main elements of an object detection apparatus 160 according to a third embodiment of the present disclosure. In FIG. 16, the same elements as those in FIG. 3 are given the same reference signs as those in FIG. 3 and therefore detailed description thereof will be omitted. The object detection apparatus 160 shown in FIG. 16 has a configuration in which a model frame identification unit 161 is inserted between the grouping unit 37 and object identification unit 38 of the object detection apparatus 30 shown in FIG. 3.

The model frame identification unit 161 obtains a model frame for covering a target object region resulting from grouping performed by the grouping unit 37. The model frame is a frame reflecting the shape of the target object and is, for example, a rectangular frame.

The model frame identification unit 161 then covers the target object region with the obtained model frame to supplement the target object region in which the grouping unit 37 has insufficiently grouped component regions.

According to the present embodiment, a target object region is supplemented using a model frame. Thus, it is possible to make the shape of the target object region analogous to the shape of a corresponding object and thus to improve the object identification accuracy of the object identification unit 38.

Fourth Embodiment

Figure 17:
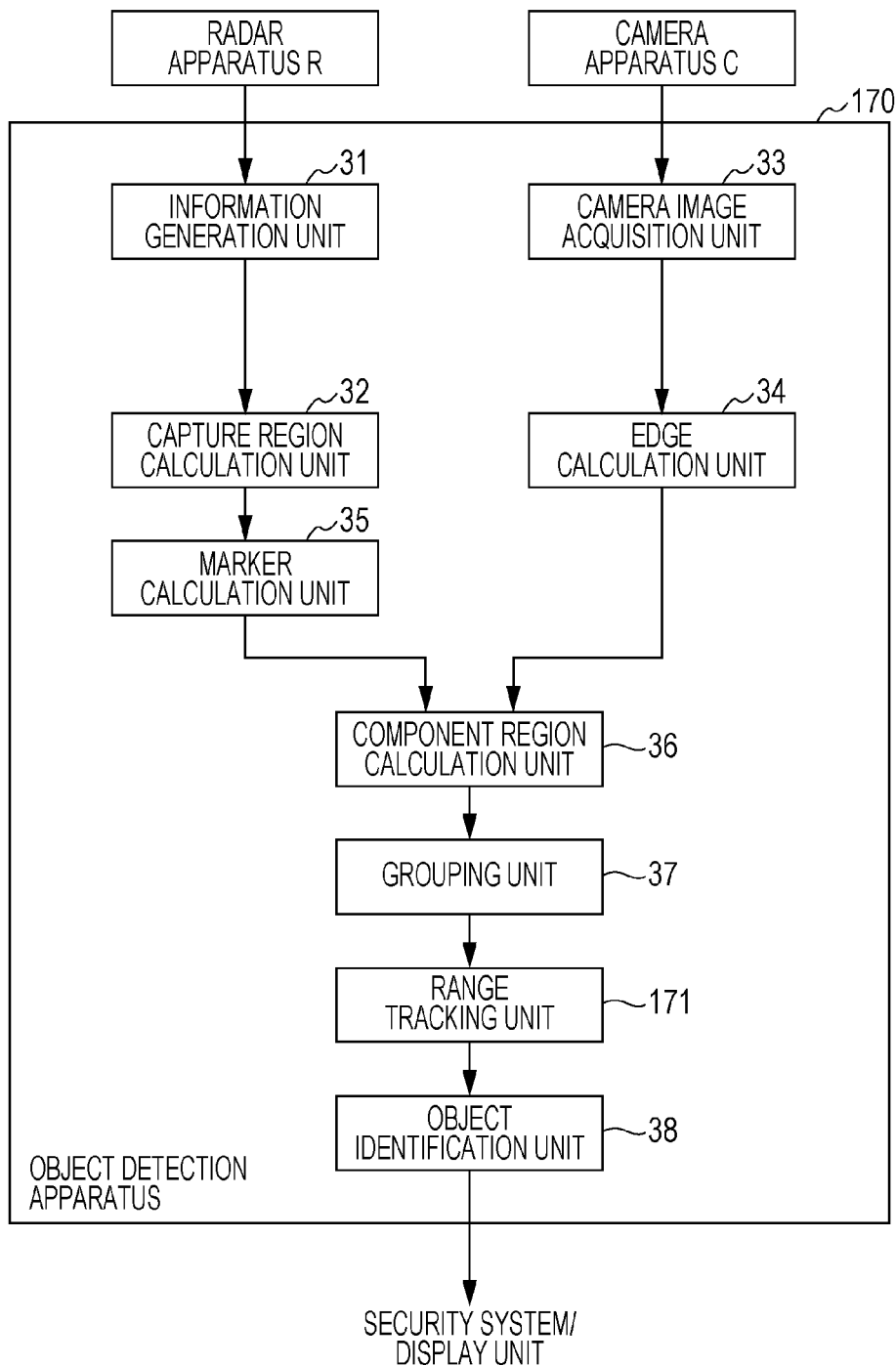
FIG. 17 shows main elements of an object detection apparatus according to a fourth embodiment of the present disclosure.

FIG. 17 is a block diagram showing main elements of an object detection apparatus 170 according to a fourth embodiment of the present disclosure. In FIG. 17, the same elements as those in FIG. 3 are given the same reference signs as those in FIG. 3 and therefore detailed description thereof will be omitted. The object detection apparatus 170 shown in FIG. 17 has a configuration in which a region tracking unit 171 is inserted between the grouping unit 37 and object identification unit 38 of the object detection apparatus 30 shown in FIG. 3.

The region tracking unit 171 tracks the position and shape of a target object region resulting from grouping performed by the grouping unit 37 during the period between different times.

Specifically, the region tracking unit 171 holds a target object region at a certain detection timing, t1. The region tracking unit 171 receives another target object region from the grouping unit 37 at a subsequent detection timing, t2, and links the target object region held at the detection timing t1 and the target object region received at the detection timing t2. The region tracking unit 171 then tracks changes in the shapes or positions of the linked target object regions to detect the movements of the target object regions.

The region tracking unit 171 then outputs information about the movements of the target object regions to an object identification unit 38. The object identification unit 38 refers to the information about the movements of the target object regions to identify target objects from the target object regions. After identifying the target objects, the object identification unit 38 may output information about the target objects as well as information about the movements of the target objects to an external display unit, security system, or the like.

According to the present embodiment, the positions and shapes of target object regions are tracked during the period between different detection timings, and the movements of the target object regions are detected. Thus, it is possible to improve the object identification accuracy, as well as to obtain information about the movements of corresponding objects.

The embodiments described above may be combined as necessary. For example, in the object detection apparatus 170 according to the fourth embodiment, the model frame identification unit 161 described in the third embodiment may be inserted between the grouping unit 37 and region tracking unit 171. According to this configuration, it is possible to make the shape of a target object region more analogous to the shape of a corresponding object, as well as to improve the accuracy with which the region tracking unit 171 detects the movement of a target object.

While the example in which the present disclosure is implemented as hardware has been described in the above embodiments, the present disclosure may be implemented as software.

The method for forming an integrated circuit is not limited to LSI and may be to use a dedicated circuit or general-purpose processor. After manufacturing the LSI, a field programmable gate array (FPGA) may be used, or a reconfigurable processor, which can reconfigure the connection or setting of the circuit cells in the LSI, may be used.

If an integrated circuit technology which replaces LSI appears due to the progress of the semiconductor technology or due to a derived technology, the function blocks may be integrated using that technology, as a matter of course. Possible such technologies include bio technologies.

The object detection apparatuses and methods according to the present disclosure are suitably used with radar and camera apparatuses for vehicles, radar and camera apparatuses for road infrastructure systems, and radar and camera apparatuses for facility monitoring systems. When any of the object detection apparatuses and methods is mounted on a vehicle along with radar and camera apparatuses for vehicles, the object detection apparatus or method detects pedestrians, bicycles, and other vehicles around the vehicle and give an alarm to the driver of the vehicle or control the drive system. Accordingly, the object detection apparatus or method helps avoid the risk of collision. When any of the object detection apparatuses and methods is used with radar and camera apparatuses for infrastructure systems, the object detection apparatus or method monitors the traffic of a road or an intersection by detecting pedestrians, bicycles, vehicles, and the like, as well as controls the infrastructure or transmits information to the driver of a vehicle. Accordingly, the object detection apparatus or method helps manage the traffic volume and avoid traffic accidents. When any of the object detection apparatuses and methods is used with radar and camera apparatuses for systems for monitoring a particular facility, the object detection apparatus or method detects flight objects and birds in midair or various types of vehicles and intruders above the ground and transmits information to a security system. Accordingly, the object detection apparatus or method helps prevent intrusion of a suspicious person.

What is claimed is:

1. An object detection apparatus comprising:
an information generation circuitry which, in operation, calculates a reflection intensity with respect to each cell of cells, the cells being obtained by dividing a distance from a radar apparatus into predetermined intervals with respect to each transmission direction of a radar signal transmitted by the radar apparatus, the reflection intensity being a representative value of power of one or more received signals, the one or more received signals being the radar signal reflected by an object and being received by the radar apparatus, and generates power profile information for each cell of the cells by using the reflection intensities;
a capture region calculation circuitry which, in operation, identifies a cell having a local highest reflection intensity in the power profile information, from among the cells as a capture point for capturing the object and identifies one or more cells surrounding the capture point as a capture region;
an edge extraction circuitry which, in operation, extracts edges of the object included in an image captured by a camera apparatus;
a marker calculation circuitry which, in operation, converts the capture region into a partial region of the image based on a coverage of the radar apparatus and a coverage of the camera apparatus and determines the partial region which is a region of the image corresponding to the capture region, as a marker;
a component region calculation circuitry which, in operation, determines component regions corresponding to components of the object by extending the marker by using the edges as boundaries;
a grouping circuitry which, in operation, groups the component regions into a target object region; and
an object identification circuitry which, in operation, identifies the object from the target object region and outputs the identification result.

2. The object detection apparatus according to claim 1, wherein the marker calculation circuitry converts the capture region into the marker by using predetermined height information of the object.

3. The object detection apparatus according to claim 1, wherein the component region calculation circuitry superimposes the marker on the edges and divides the marker by an edge of the edges when the marker extends over the edge.

4. The object detection apparatus according to claim 1, wherein the information generation circuitry calculates a Doppler speed for each cell of the cells based on a delay profile obtained from the one or more received signals by the radar apparatus and generates Doppler profile information indicating the Doppler speed for each cell of the cells, and the capture region calculation circuitry compares each Doppler speed of the cells included in the capture region and removes a cell having an inconsistent Doppler profile value from the capture region.

5. The object detection apparatus according to claim 1, further comprising a model frame identification circuitry that target object region supplements the target object region with a model frame which covers the target object region for groping the component regions.

6. The object detection apparatus according to claim 1, further comprising a region tracking circuitry which, in operation, tracks a change in a shape of the target object region associated with passage of time to detect information about a movement of the target object region.

7. A radar apparatus for vehicles, comprising:
the object detection apparatus according to claim 1; and
a radar apparatus connected to the object detection apparatus.

8. A radar apparatus for road infrastructure systems, comprising:
the object detection apparatus according to claim 1; and
a radar apparatus connected to the object detection apparatus.

9. A radar apparatus for monitoring systems, comprising:
the object detection apparatus according to claim 1; and
a radar apparatus connected to the object detection apparatus.

10. An object detection method comprising:
calculating a reflection intensity with respect to each cell of cells, the cells being obtained by dividing a distance from a radar apparatus into predetermined intervals with respect to each transmission direction of a radar signal transmitted by the radar apparatus, the reflection intensity being a representative value of power of one or more received signals, the one or more received signals being the radar signal reflected by an object and being received by the radar apparatus, and generating power profile information for each cell of the cells by using the reflection intensities;

identifying a cell having a local highest reflection intensity in the power profile information, from among the cells as a capture point for capturing the object and identifying one or more cells surrounding the capture point as a capture region;

extracting edges of the object included in an image captured by a camera apparatus;

converting the capture region into a partial region of the image based on a coverage of the radar apparatus and a coverage of the camera apparatus and determining the partial region which is a region of the image corresponding to the capture region, as a marker;

determining component regions corresponding to components of the object by extending the marker by using the edges as boundaries;

grouping the component regions into a target object region; and identifying the object from the target object region and outputting the identification result.

* * * * *